United States Patent
Dorn et al.

(10) Patent No.: US 10,126,796 B2
(45) Date of Patent: *Nov. 13, 2018

(54) ELECTRIC VEHICLE DISTRIBUTED INTELLIGENCE

(71) Applicant: Accenture Global Services Limited, Dublin (IE)

(72) Inventors: John Z. Dorn, London (GB); Wade P. Malcolm, Sunnyvale, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,061

(22) Filed: Sep. 15, 2017

(65) Prior Publication Data

US 2018/0018007 A1 Jan. 18, 2018

Related U.S. Application Data

(63) Continuation of application No. 13/766,518, filed on Feb. 13, 2013, now Pat. No. 9,766,671.
(Continued)

(51) Int. Cl.
*G06Q 40/00* (2012.01)
*G06F 1/26* (2006.01)
(Continued)

(52) U.S. Cl.
CPC ............ *G06F 1/26* (2013.01); *B60L 11/1838* (2013.01); *B60L 11/1844* (2013.01);
(Continued)

(58) Field of Classification Search
CPC .... G06Q 40/00; G06Q 20/382; G06Q 20/102; B60W 20/00
See application file for complete search history.

(56) References Cited

U.S. PATENT DOCUMENTS 8,417,391 B1 4/2013 Rombouts et al.
8,521,337 B1 8/2013 Johnson
(Continued)

FOREIGN PATENT DOCUMENTS

CN 101896930 A 12/2008
EP 1294071 A2 3/2003
(Continued)

OTHER PUBLICATIONS

Charging ahead: electric car buzz drives firm's fuel station plan, Vara-Orta, Francisco. Los Angeles Business Journal31.34: 1(2). CBJ, L.P. (Aug. 24, 2009).*
(Continued)

*Primary Examiner* — Lalita M Hamilton
(74) *Attorney, Agent, or Firm* — Brinks Gilson & Lione

(57) ABSTRACT

The present disclosure provides system and methods for electric vehicle distributed intelligence. A system may determine scheduled charging times and scheduled charging locations to charge electric vehicles. The scheduled charging locations may correspond to charging stations geographical distributed throughout a power grid. The system may receive parameters related to power grid components configured to affect distribution of power. The system may forecast a power demand for charging the electric vehicles at the scheduled charging times and scheduled charging locations. The system may determine that a power demand to charge the electric vehicles is greater or less than power made available by the power grid components at the charging stations. The system may cause power to be reallocated among the power grid components in response to determination that the power demand to charge the electric vehicles is greater or less than power made available by the power grid components.

20 Claims, 9 Drawing Sheets

Related U.S. Application Data

(60) Provisional application No. 61/598,109, filed on Feb. 13, 2012.

(51) Int. Cl.

| | | |
|---|---|---|
| *B60L 11/18* | (2006.01) | |
| *G06Q 10/04* | (2012.01) | |
| *G06Q 30/02* | (2012.01) | |
| *G06Q 50/06* | (2012.01) | |
| *G08G 1/00* | (2006.01) | |
| *H02J 3/32* | (2006.01) | |
| *H02J 3/00* | (2006.01) | |

(52) U.S. Cl.
CPC .......... *B60L 11/1846* (2013.01); *G06Q 10/04* (2013.01); *G06Q 30/0202* (2013.01); *G06Q 50/06* (2013.01); *G08G 1/20* (2013.01); *H02J 3/32* (2013.01); *B60L 2240/72* (2013.01); *B60L 2260/54* (2013.01); *H02J 2003/003* (2013.01); *H02J 2003/007* (2013.01); *Y02E 60/721* (2013.01); *Y02E 60/76* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 10/54* (2013.01); *Y04S 30/14* (2013.01); *Y04S 40/22* (2013.01); *Y04S 50/14* (2013.01)

(56) References Cited

U.S. PATENT DOCUMENTS

| | | |
|---|---|---|
| 2002/0132144 A1 | 9/2002 | McArthur et al. |
| 2008/0040479 A1 | 2/2008 | Bridge et al. |
| 2009/0313103 A1 | 12/2009 | Ambrosio et al. |
| 2010/0131139 A1 | 5/2010 | Sakai et al. |
| 2010/0134067 A1 | 6/2010 | Baxter et al. |
| 2010/0138066 A1 | 6/2010 | Kong |
| 2010/0217550 A1 | 8/2010 | Crabtree et al. |
| 2010/0332373 A1 | 12/2010 | Crabtree et al. |
| 2011/0184586 A1 | 7/2011 | Asano et al. |
| 2011/0202418 A1 | 8/2011 | Kempton et al. |
| 2011/0231028 A1 | 9/2011 | Ozog |
| 2011/0282513 A1 | 11/2011 | Son et al. |
| 2012/0019215 A1 | 1/2012 | Wenger et al. |

FOREIGN PATENT DOCUMENTS

| | | |
|---|---|---|
| EP | 2495844 A1 | 9/2012 |
| EP | 2602901 A1 | 6/2013 |
| EP | 2683052 A1 | 1/2014 |
| JP | 2010-512727 A | 4/2010 |
| JP | 2011-61931 | 3/2011 |
| WO | WO 2008/073453 A1 | 6/2008 |
| WO | WO 2012/017937 A1 | 2/2012 |
| WO | WO 2012/054540 A1 | 4/2012 |
| WO | WO 2012/161993 A2 | 11/2012 |

OTHER PUBLICATIONS

Clement-Nyns, K., Haesen, E., Driesen, J., "The Impact of Charging Plug-In Hybrid Electric Vehicles on a Residential Distribution Grid," Feb. 2010, pp. 371-380, IEEE Transactions on Power Systems, vol. 25, No. 1, IEEE Electrical Power & Energy Conference, 2010.

Chinese Search Report dated Mar. 11, 2016, pp. 1-2, issued in Chinese Patent Application No. 201380016678.2, State Intellectual Property Office of the P.R.C., China.

European Office Action dated Nov. 30, 2016 pp. 1-5, issued in corresponding European Application No. 13 725 197.1-1807, Patent Office, Rijswijk, The Netherlands.

International Search Report and Written Opinion for International Patent Application No. PCT/IB2013/000666, dated Feb. 13, 2014 (13 pages).

Kelly, L., Rowe, A., Wild, P., "Analyzing the Impacts of Plug-in Electric Vehicles on Distribution Networks in British Columbia," 2009 IEEE Electrical and Power Conference, pp. 1-6, © Oct. 2009 IEEE.

Liu, R., Dow, L., Liu, E., "A Survey of PEV Impacts on Electric Utilities," Jan. 17-19, 2011, pp. 1-8, IEEE PES Innovative Smart Grid Technologies Conference, Anaheim, CA, USA.

"Oracle Utilities Network Management System, Installation Guide," 70 pages. (Jun. 2010).

"Oracle Utilities Smart Grid Gateway MV-90 Adapter for Itron, Configuration Guide," 20 pages (Oct. 2011).

Patent Examination Report No. 1, dated Dec. 8, 2014, pp. 1-3, issued in Australian Application No. 2013220074, Offices of IP Australia, Woden ACT, Australia.

Putrus, G.A., Suwanapingkarl, P., Johnston,D., Bentley, E.C., Narayana, M., "Impact of Electric Vehicles on Power Distribution Networks," 2009, pp. 827-831, © IEEE Sep. 2009.

Russian Office Action dated Mar. 2, 2017, pp. 1-6, issued in corresponding Russian Application No. 2014137174.

Singapore Search Report, dated Jun. 26, 2015, pp. 1-3, issued in Singapore Patent Application No. 11201404797S, Intellectual Property Office of Singapore, Singapore.

Written Opinion of the Intellectual Property Office of Singapore, dated Jun. 26, 2015, pp. 1-8, issued in Singapore Patent Application No. 11201404797S, Intellectual Property Office of Singapore, Singapore.

Japanese Office Action with English translation, issued in Japanese Patent Application No. 2014-557134, dated Jan. 16, 2018, pp. 1-5, Japanese Patent Office, Tokyo, Japan.

Shinpei Chihara et al., "EV Charging Infrastructures," NEC Technical Journal, dated 2012, pp. 19-23, vol. 27, No. 1, NEC Smart Energy Solutions Business, Japan.

\* cited by examiner

ELECTRIC VEHICLE DISTRIBUTED INTELLIGENCE

CROSS-REFERENCE TO RELATED APPLICATIONS

This application is a continuation of U.S. patent application Ser. No. 13/766,518, entitled "ELECTRIC VEHICLE DISTRIBUTED INTELLIGENCE", filed Feb. 13, 2013, which claims to U.S. Provisional Patent Application No. 61/598,109, filed Feb. 13, 2012, both of which are incorporated herein by reference in their entirety.

BACKGROUND

1. Field of the Disclosure

The present disclosure relates generally to a system and method for managing an industry network, and more particularly to a system and method for collecting data at different sections of the industry network and analyzing the collected data in order to manage electric vehicle power distribution and charging.

2. Related Art

A power grid may include one or all of the following: electricity generation, electric power transmission and electricity distribution. Electricity may be generated using generating stations, such as a coal fire power plant, a nuclear power plant, etc. For efficiency purposes, the generated electrical power is stepped up to a very high voltage (such as 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as 138K Volts). From a transmission substation, smaller transmission lines (such as sub-transmission lines) transmit the intermediate voltage to distribution substations. At the distribution substations, the intermediate voltage may be again stepped down to a "medium voltage" (such as from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as 120V). The consumer voltage may then be used by the consumer, for instance, to charge electric vehicles.

One or more power companies may manage the power grid, including managing faults, maintenance, and upgrades related to the power grid. However, the management of the power grid is often inefficient and costly. For example, a power company that manages the local distribution network may manage faults that may occur in the feeder circuits or on circuits, called lateral circuits, which branch from the feeder circuits. The management of the local distribution network often relies on telephone calls from consumers when an outage occurs or relies on field workers analyzing the local distribution network.

Power companies have attempted to upgrade the power grid using digital technology, sometimes called a "smart grid." For example, more intelligent meters (sometimes called "smart meters") are a type of advanced meter that identifies consumption in more detail than a conventional meter. The smart meter may then communicate that information via some network back to the local utility for monitoring and billing purposes (telemetering). While these recent advances in upgrading the power grid are beneficial, more advances are necessary. It has been reported that in the United States alone, half of generation capacity is unused, half the long distance transmission network capacity is unused, and two thirds of its local distribution is unused. Therefore, a need clearly exists to improve the management of the power grid.

A specific example of managing the power grid relates to charging of electric vehicles ("EV"). The electric vehicle industry is growing with an increasing number of EV charging stations being added in both commercial and residential locations to support growing numbers of electric vehicles. With the added number of charging stations, their load drawn from power grids is increasing, especially at night when people typically plug in their electric vehicles to charge. Sections of the grid may be unable to handle the increase in load from charging stations, which are able to draw significant amounts of power in a short period of time (depending on the type of charging station). Therefore, a need exists to efficiently and effectively manage charging stations.

BRIEF SUMMARY

The present disclosure generally relates to a system and method for managing an industry network. The embodiments disclosed herein describe a system and method for collecting data at different sections of the industry network and analyzing the collected data in order to manage electric vehicle power distribution and charging.

A system and method for distributed intelligence of power tracking and power allocation may include: receiving data by at least one computer from a plurality of identified charging stations and vehicles of customers at distributed locations throughout a power grid; analyzing, with at least one processor of the at least one computer, the data with respect to available power for those locations and customer historical usage and profiles; and sending commands, with the at least one processor, to reallocate power to assets of the power grid to handle fluctuations or forecasted fluctuations in power demand based on the analysis. The analysis may further consider a time of day and/or a day of week. The analysis may further consider customer preferences within the profiles. The analysis may further consider real-time customer inputs regarding planned trips or planned charges.

A system and method for distributed intelligence of power tracking and power allocation may also include: receiving, by at least one computer, first parameters related to system and charging infrastructure within power transmission and distribution assets of a power grid; and second parameters related to electric vehicle (EV) customers and customer preferences; analyzing, using at least one processor, the first parameters to determine available power for charging stations connected to the power grid assets; analyzing, using the at least one processor, the first and second parameters to determine whether EV charging in relation to the customer preferences can be met by the available power at the charging stations; and in response to determining that the customer preferences cannot be met by the determined available power, the processor executing instructions to: execute a demand response in the power grid to compensate for a lack of available power for EV charging; and execute economic rules drawn to EV charging to incentivize the EV customers to comply with the demand response.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

DETAILED DESCRIPTION

By way of overview, the example embodiments described below relate to a system for collecting data at different sections of the industry network and analyzing the collected data in order to manage electric vehicle power consumption and charging. The network may include a fleet of electric vehicles ("EV") and EV charging stations. The electric vehicles and the EV charging stations may contain various sensors that communicate wirelessly, over a wired network and/or through power lines to provide data of usage, maintenance needs and scheduling (to name a few examples) to and from a central control. This data may be used by a charging infrastructure management system.

For instance, a single charge may not be sufficient for operators to travel to some locations the next day, necessitating a planned stop en route to conduct further charging. Other complexities of electric vehicle power usage have created a need for tracking their power usage and for analysis and prediction of charging requirements, maintenance and the like with reference to the electric vehicles and EV charging stations; and for power load shedding and/or power supply adjustment based on load demand on the power grid side. The intelligence required to track and control power usage requirements of electric vehicles is distributed and dynamic, and presents a particular challenge that has yet to be addressed in a sophisticated, efficient way.

Figure 1:
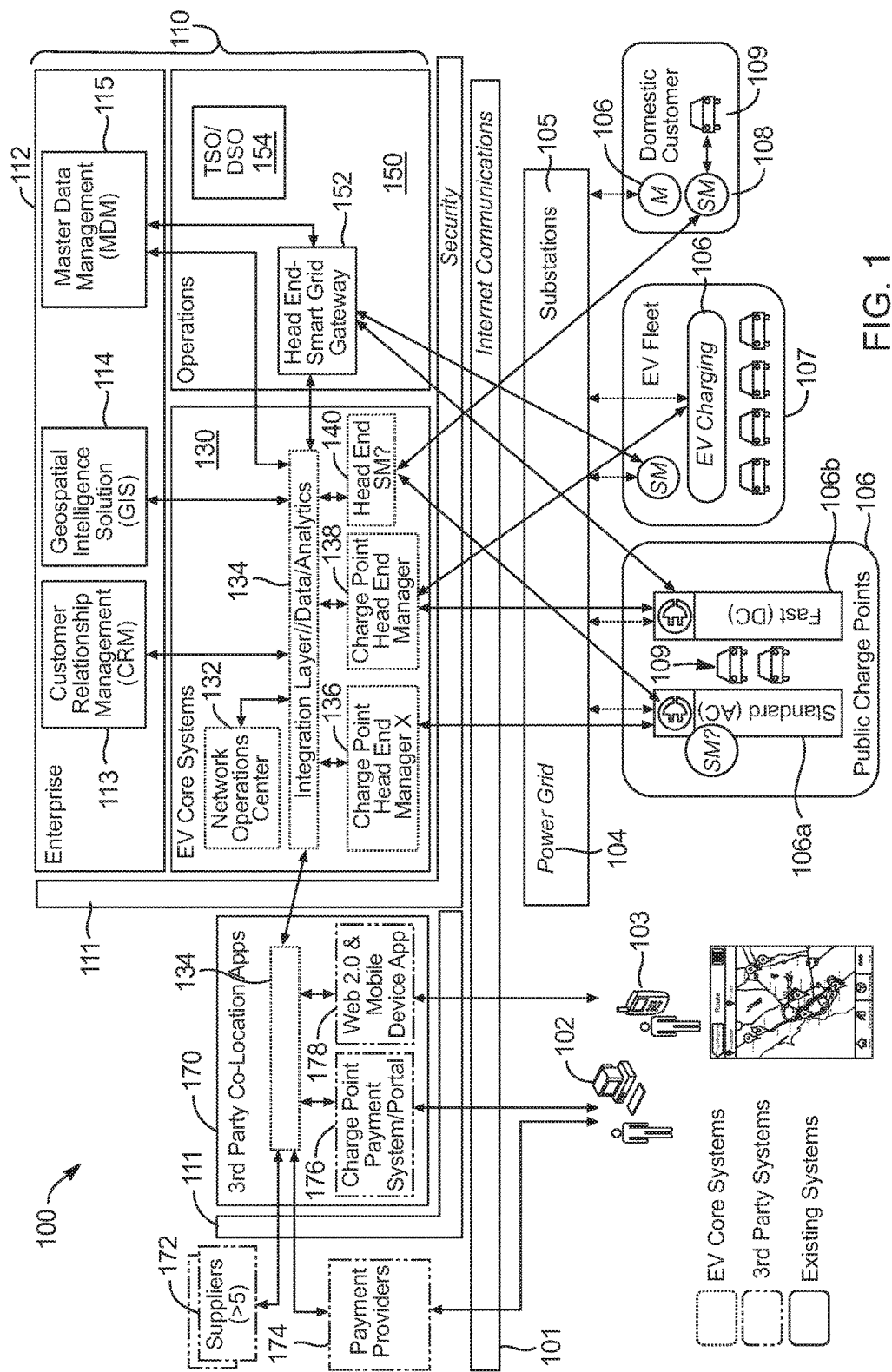
FIG. 1 is a block diagram of an exemplary system for intelligent management of a distributed network of electric vehicles ("EVs") and EV charging stations, e.g., an EV charging infrastructure and operating center.
Figure 2:
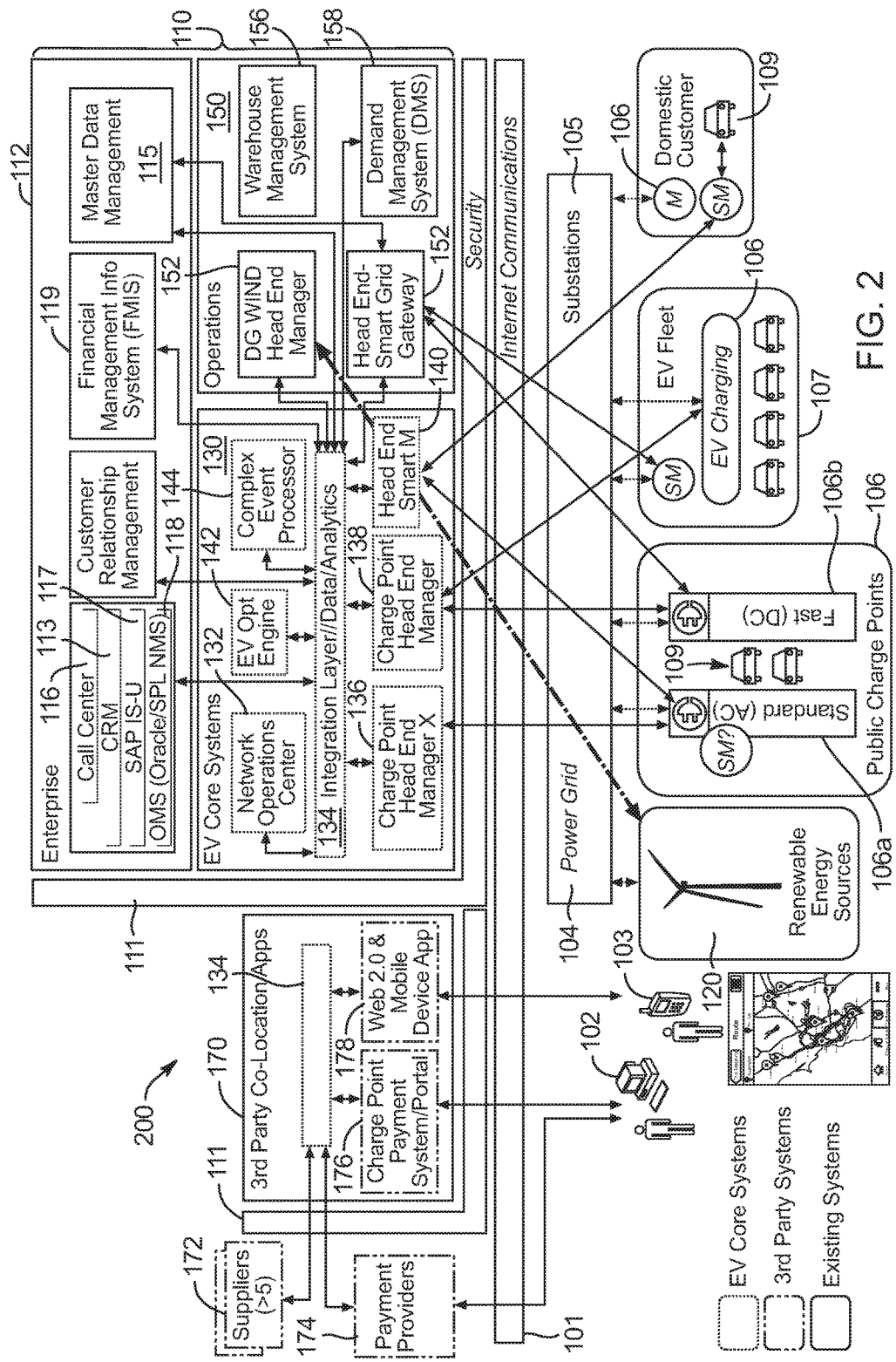
FIG. 2 is a block diagram of an advanced version of the system of FIG. 1, showing additional capability in a further embodiment of the EV charging infrastructure management system of FIG. 1.

FIG. 1 shows an exemplary system 100 for intelligent management of a distributed network of electric vehicles ("EVs") and EV charging stations, e.g., an EV charging infrastructure and operating center. FIG. 2 shows another exemplary EV charging infrastructure management system 200, an alternative version of system 100, having additional capability as explained below. In explaining the charging infrastructure management systems 100, 200, reference will be made to U.S. patent application Ser. No. 12/378,102, filed Feb. 11, 2009 (published as U.S. Application No. 2009-0281674 A1); U.S. patent application Ser. No. 12/637,672, filed Dec. 14, 2009 (published as U.S. Application No. 2010-0152910 A1); U.S. patent application Ser. No. 12/830,053, filed Jul. 2, 2010 (published as U.S. Application No. 2011-0004446 A1) and to U.S. Provisional Patent Application No. 61/315,897, filed Mar. 19, 2010, each of which are herein incorporated by reference in their entireties. The incorporated patent applications will be referred to, respectively, as the '102, '672, '053 and '897 applications.

The charging infrastructure management systems 100, 200 may run in conjunction with and/or using the Intelligent Network Data Enterprise (hereinafter, termed INDE) Reference Architecture, which may be improved by using Intelligent Network Data Services (hereinafter, termed INDS), both of which are disclosed in the '102, '672, '053 and '897 applications. As will be discussed, some of the components of the INDE and/or INDS may perform the functions or features of the components or parts of the charging infrastructure management systems 100, 200.

The charging infrastructure management system 100 provides a distributed intelligence system that may be used to track power usage of electric vehicles across a fleet or from various domestic customers. The system 100 includes a network 101 through which to communicate, which may be wired or wireless or a combination thereof, and may include the Internet and other communications networks, whether of the LAN or WAN variety. A plurality of customer computers 102 and mobile devices 103 may access the network 101 and services provided by the system 100.

The system 100 further comprises a power grid 104 that includes substations 105 at which some of the logic and intelligence may reside in order to gather data and control power allocation. The system 100 further includes multiple public charge points or charging stations 106. The multiple charge points may include standard (AC) charge points 106a (Type I), fast (DC) charge points 106b (Type II), or both standard (AC) charge points 106a and fast (DC) charge points 106b, as illustrated in FIG. 1. A smart meter (SM) may be integrated with the charging stations 106 to perform one, some, or all of the following: track usage at times of day (including general tracking of usage based on all vehicles and/or tracking usage to specific vehicles). The system 100 may also include a fleet 107 of electric vehicles with associated EV charging stations 106, where the electric vehicles and the charging stations may include smart meters (SM). The system 100 may also include a number of domestic customers 108 that drive their respective electric vehicles 109 and charge them at their respective private charging station 106. Smart meters (SM) may also be integrated in the domestic customer's electric vehicles and charging stations. In alternative embodiments, the electric vehicles and/or the charge points may be smart devices themselves and capable of communication with the distributed intelligence system as disclosed below.

The smart meters and devices may collect power usage data, including amount of power drawn from the power grid 104, during what periods of the day and according to vehicle identification. This data may be sent to an operating center 110 for the EV charging infrastructure management system 100. The operating center 110 may be secured by levels of security 111 such as the security framework described in the '102, '672, '053 and '897 applications. The operating center 100 of the system may include, but not be limited to, an enterprise system 112, EV core systems 130 and/or an operations controller 150. These aspects of the operations center 110 may correlate in some regard to the INDE infrastructure and system of the '672 and '053 applications. The enterprise system 112 may correlate to the enterprise system and/or enterprise IT of the '672 and '053 applications. The EV core systems 130 may correlate to the INDE core of the '672 and '053 applications and the operations controller 150 may correlate to the operations control center of the '672 and '053 applications.

The enterprise system 112 may include a customer relationship management (CRM) application 113 (such as that made by SAP) for tracking specific domestic customers 108 and their respective smart electric vehicles and charging stations (or smart meters) and making decisions regarding same. The customer relationship management application 113 may also track and analyze data from elsewhere off the power grid, including public charge points and a fleet of electric vehicles.

The enterprise system 112 may further include a geospatial intelligence solution (GIS) application 114. The GIS application allows efficient management of critical geospatial data throughout every stage of a life cycle. From geospatial data capture to processing, integration, and infrastructure management. GIS software enables efficient access to critical geospatial data and intelligence information.

The enterprise system 112 may further include a master data management (MDM) application 115, an enterprise strategy that treats master data as a corporate asset with enormous top-line and bottom-line impact. It facilitates data consistency across multiple systems for streamlined business processes (operational MDM) and enterprise reporting (analytical MDM) while ensuring end-to-end data stewardship and master data governance.

The EV core systems 130 may include, but are not limited to, a network operations center (NOC) 132, an integration layer 134, a charge point head end manager X 136, another charge point head end manager 138, and a head end smart meter 140. The NOC 132 may be an OMS-Oracle® Utilities Network Management System (NMS) or some other system. The integration layer 134 may pass and integrate data and analytics to and from: various parts of the power grid, such as substations and charge points or charging stations; electric vehicles; and the enterprise system 112. The charge point head end managers 136, 138 may manage the head ends, sub-systems that are responsible for communicating with meters and smart meters (such as collecting data from them and providing the collected data to the utility). The head end service manager 140 may consolidate data in an intelligent manner, for instance, combine charging data from distributed charge points for corresponding vehicles identified by a unique ID. In this way, the charging activity of respective vehicles may be tracked and the data efficiently combined for analysis by the EV core systems 130 and/or the enterprise system 112.

The operations controller 150 may include, but is not be limited to, a head end or smart grid gateway 152 and transmission system operators (TSO) and/or distribution system operators (DSO). The smart grid gateway 152, for instance, may include an Oracle® Utilities Smart Grid Gateway MV90 (for Itron), which is based on the Oracle® Utilities Application Framework (OUAF). The smart grid gateway 152 provides measurement data loading and processing for adapting data types into formats useable by the rest of the operating center 110.

With further reference to FIG. 2, the EV charging infrastructure management system 200 may include additional functionality and sophistication. The system 200 may track and control parts of the grid that draw power from the grid, such as EV charging, and may track and control parts of the grid that add power to the grid, such as renewable energy sources 120. From a consumer perspective, distributed generation is the ability to generate on-premises energy that can be fed back into the distribution grid. Examples of distributed generation focus on renewable energy resources, including solar panels on the roofs of buildings, small wind turbines and electric vehicles. e.g., the electric vehicles having excess energy capacity at the time the generation is needed. Distributed generation gives rise to net metering, where energy outflows from the local energy sources are deducted from metered energy inflows.

The enterprise system 112 may further include a call center 116, an SAP IS-U system 117, an Oracle® Management Server (OMS) 118 and a financial management information system (FMIS) 119. The call center 116 may field calls from people that experience or witness issues with the grid or some aspect of the charging infrastructure system. An operator can then input information regarding troubleshooting calls or witness reports and the like, which becomes part of the enterprise data available for access by the analytics of the enterprise system 112.

The SAP IS-U system 117 is an industry-specific solution for the utilities industry: a sales and information system that supports utility companies, among others. The SAP IS-U system 117 may help to sell and manage sales of charging services to the public and to private customers.

The Oracle® Management Server (OMS) 118 functions in the context of an Oracle® Enterprise Manager (OEM) environment. The OMS 118 functions as a middle tier between "Oracle intelligent agents," which may operate on multiple nodes and by default use a schemed named DBSNMP, and management consoles, where database managers view and control their OEM domains.

The financial management information system (FMIS) 119 may provide the analytics in regards to budgets and tracking expenditures. In the context of the present disclosure, the FMIS 119 may help track and predict costs associated with charging electric vehicles, including the ability to track rate changes from day to day, as it impacts a customer's ability to live within a desired budget. The FMIS 119, accordingly, enables the system 200 to help EV consumers track and control how much they spend on electricity, a replacement for gas prices and the like but with more sophistication. The FMIS 119 can consider time of day or week, when the most innovative rates are available, and conduct localized economic analysis.

The EV core systems 130 may further include an EV optimization engine 142 and a complex event processor (CEP) 144, both of which are discussed in more detail with reference to FIG. 5. The EV optimization engine 142 and CEP 144 may provide a substantial portion of the analytics available in the system 200 for the management of EV charging, arbitrage and optimization as explained below.

The operations controller 150 may further include an OMS warehouse management system (WMS) 156, a demand management system (DMS) 158 and a DG wind head end manager 162. The OMS WMS 156 is designed to improve productivity and efficiency of a warehouse operation that saves on costs and speeds up production. The OMS WMS 156 may be applied to the storage and moving of power around the grid, and from substation to substation and pole top to pole top according to power draw from parts of the grid. Electric vehicle charging will create pockets and peak periods of high demand that the OMS WMS 156 is designed to help manage.

The DG wind head end manager 162 may manage where in the grid and when the renewable energy sources 120 are provided as extra energy. This could be done during peak hours and to parts of the grid under heaviest power demand.

The DMS 158 may work in conjunction with analytics of the EV core systems 130 and possibly the operations controller 150 to control the power distribution of the power grid 104 and substations 105. The DMS 158 may send commands to the substations and the transformers to shift power from one part of the power grid to another part of the power grid.

With continued reference to FIGS. 1 and 2, one or more third party co-location applications 170 may be integrated with the integration layer 134 and receive data and analytics information from the operating center 110. The co-location applications 170 may include a charge point payment system and portal 176 and a Web 2.0 & mobile device application 178. These applications may interact with power suppliers 172, payment providers 174 and with the computers and mobile devices of the customers 102 and mobile users 103. The charge point system and portal 176 may act as a liaison between the computers 102 and mobile devices 103 and the payment providers 174 (such as credit card companies and/or banks) and power suppliers 172 (such as the utilities).

Figure 4:
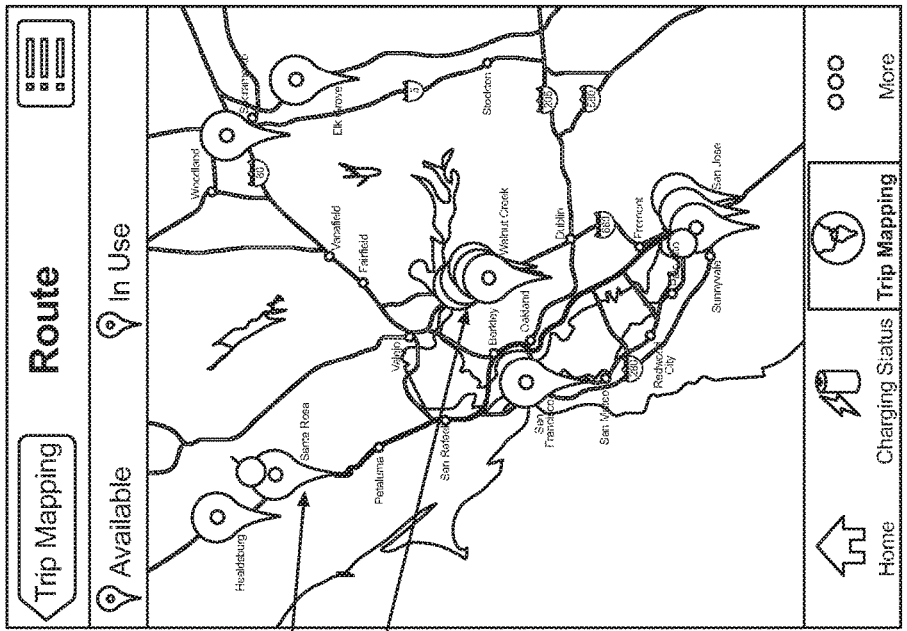
FIG. 4 is an explanatory diagram showing use of an EV mobile application that provides real-time data to operators to help them find and navigate to charging stations for use during travel, the EV mobile application integrated into the EV chagrining infrastructure management system of FIGS. 1-3.

The Web 2.0 & mobile device application 178 may be executed from a server and displayed on mobile devices 103, containing information such as rate information, usage data and billing information associated with a customer's power usage from EV charging, for instance. The application 178 may make available on mobile devices 103 the same information and data made available on other computers 102 by the charge point payment system and portal 176. The Web 2.0 & mobile device application 178 may also, as shown in FIG. 4, provide to mobile devices 103 the ability for users to search, find, map and get turn-by-turn directions to charge point stations, to determine if the station is available or in use, and/or to provide information as to cost of charging at the charge point station. The mobile device user may then start and stop a charging session directly from the mobile (or other handheld smart) device, and receive real-time charging status notifications.

Figure 3:
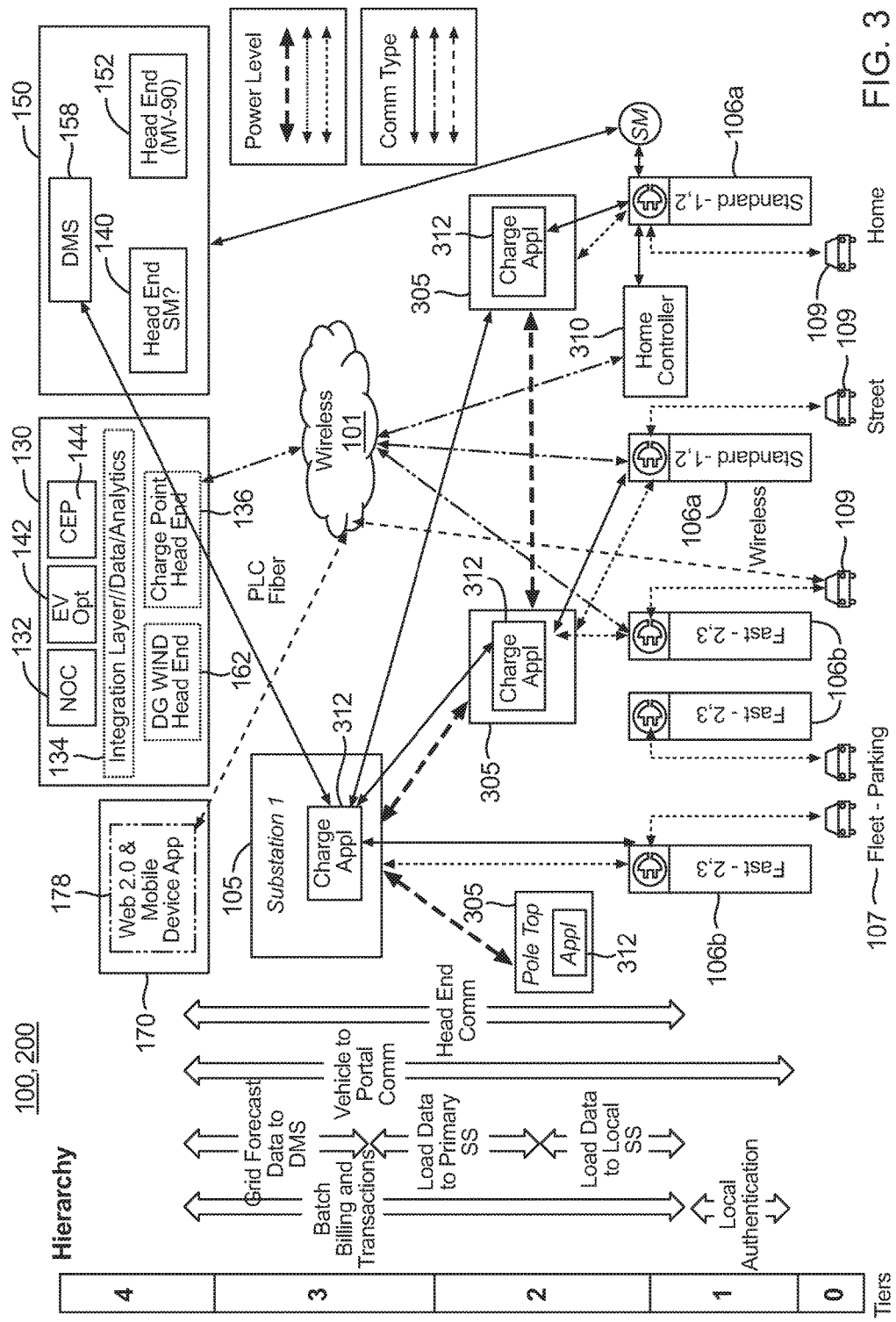
FIG. 3 is a block diagram of a hierarchy view of the EV charging infrastructure management systems of FIGS. 1 and 2, showing flow of power and types of communication between different levels of the grid and a fleet of electric vehicles and of EV charging stations.

FIG. 3 shows a hierarchy view of the EV charging infrastructure management systems 100, 200 of FIGS. 1 and 2, showing flow of power and types of communication between different levels of the grid and a fleet 107 of electric vehicles and of EV charging stations 106. The different levels of the grid include, but are not limited to: (4) enterprise; (3) substation; (2) pole top 305; and (1) local. Pole top 305 refers to the transformer level and local refers to the street level, such as in parking lots, charging stations and in homes. A home controller 310 may provide a gateway for communication between a home (or residential) charging station 108 and the network 101.

The logic and analytics discussed with reference to FIG. 5 may be tracked and facilitated depending on the hierarchical level at which the data is being processed or analytics performed. A charge application 312 may make smart (or intelligent) the grid or component of the grid shown at each level of the hierarchy. The head ends 136, 140, 152 and/or 162 may provide or at least facilitate the intelligence, data processing and data integration at the enterprise level.

The communication of the charging and power usage data may flow through a variety of methods, including power line communication (PLC) through the grid 104, which may include fiber in addition to power lines. Communication may also be executed through the network 101 which may include a wireless aspect and other computerized and networked communication outside of the power lines. The electric vehicles 109 may communicate wirelessly and/or in a wired fashion, to track levels of charge and charging activity by identified electric vehicles and charging stations. Analytics and intelligence may then be passed back to users of the electric vehicles to their mobile devices 103, computers 102 and/or to the electric vehicles 109, e.g., to a display panel or computer in the vehicle.

From left to right, a general flow of intelligence of the EV charging infrastructure management system 200 is shown. At the local or street level, local authentication may be required for the smart devices and meters to communicate with the rest of the system 200, including with the grid 104, the substations 105 and the network 101. At the pole top and substation levels, the system 200 may perform batch billing and transactions with reference to electric power distribution.

At the substation level, grid power demand may be forecasted to the demand management system 158 at the enterprise level. Furthermore, between the pole top and the substation levels, the system 200 may communicate load data to a primary substation 105 of the system 200. Between the local and pole top levels, the system 200 may communicate data to the load substations. Between the local and enterprise levels, the electric vehicles may communicate to the charge point payment system and portal 276 and/or the Web 2.0 & mobile device application 178. Finally, the system 200 may provide communications between the head ends at the enterprise level and the other three levels of the hierarchy: the substation, the pole top and the local levels.

Figure 5:
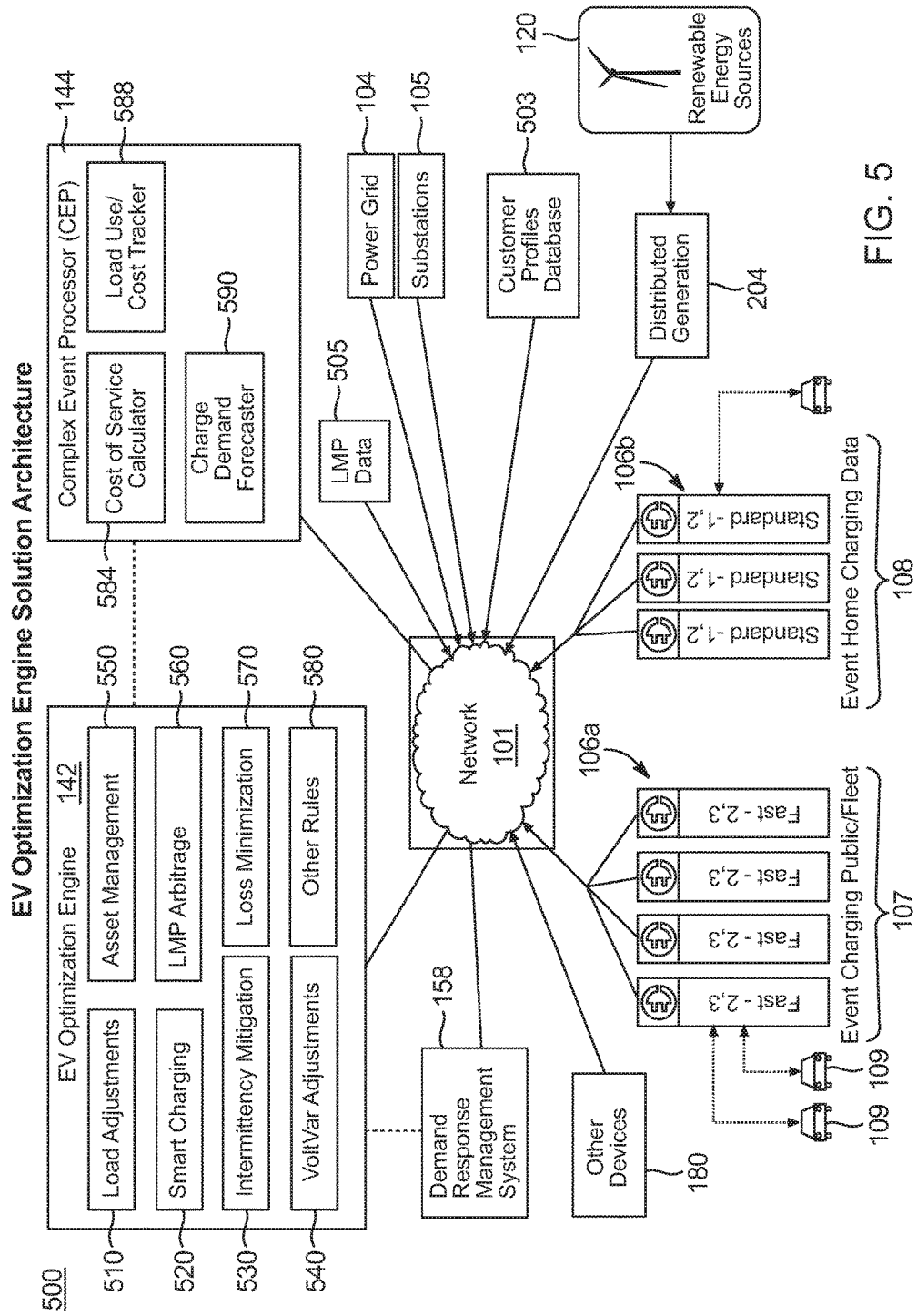
FIG. 5 is a block diagram of an exemplary EV optimization engine solution architecture that interfaces with and is a part of the EV charging infrastructure management systems of FIGS. 1-3.

FIG. 5 is an exemplary EV optimization engine solution architecture 500 that interfaces with and is a part of the EV charging infrastructure management systems 100, 200 of FIGS. 1-3. The architecture 500 may include the EV optimization engine 142, the complex event processor (CEP) 144, the demand response management system 158, a customer profiles database 159, other devices 180 that consume and/or generate power, distributed generation 204, a customer profiles database 503, and locational marginal prices (LMP) data 505 that may be stored in a database. All of these aspects of the optimization engine solution architecture 500 may be combined into one or more servers, memory storage devices and processing devices and may be implemented as a stand-alone computer or as a distributed system that communicates through the network 101. The functions of the optimization engine solution architecture 500 may also be shared with other components and applications executed at the enterprise level, whether in the enterprise system 112, the EV core systems 130 or the operations controller 150.

The EV optimization engine 142 may include, but is not limited to, processors or software modules executable by one or more processors for: load adjustments 510; smart charging 520; intermittency mitigation 530; dynamic voltage and capacitance (VoltVAr) adjustments 540; asset management 550; LMP (locational marginal pricing) arbitrage 560; loss minimization 570; and other rules 580. The CEP 144 may include, but not be limited to, a cost of service calculator 584, a load use/cost tracker 588 and a charge demand forecaster 590. The CEP 144 may be functionally integrated with the FMIS 119, or receive analysis data from the FMIS 119 with which to perform further analysis and forecasting.

The load adjustments 510 may simulate actual conditions in the power grid should a certain amount of power be transferred from one location to another, such as from on substation to another or between transformers or other transfers.

The smart charging 520 may track individual smart meters (SM) within the charging stations 106 and within identified electric vehicles 109 such that scheduling can be coordinated and/or suggested to EV customers so as to optimize power usage by spreading it out over typical days and a typical week.

The intermittency mitigation 530 may strive to deal with intermittent supplies of power where they are not always predictable. This includes sources of renewable power such as wind.

Electric utility companies today constantly struggle to find a balance between generating sufficient power to satisfy their customers' dynamic load requirements and minimizing their capital and operating costs. They spend a great deal of time and effort attempting to optimize every element of their generation, transmission and distribution systems to achieve both their physical and economic goals. In many cases, "real" generators waste valuable resources—waste that if not managed efficiently can go directly to the bottom line. Energy companies therefore find the concept of a "virtual generator," or a virtual source of energy that can be turned on when needed, very attractive. Although generally only representing a small percentage of utilities' overall generation capacity, virtual generators are quick to deploy, affordable, cost-effective and represent a form of "green energy" that can help utilities meet carbon emission standards.

Virtual generators use forms of dynamic voltage and capacitance (Volt/VAr) adjustments 540 that are controlled through sensing, analytics and automation. The overall process involves first flattening or tightening the voltage profiles by adding additional voltage regulators to the distribution system. Then, by moving the voltage profile up or down within the operational voltage bounds, utilities can achieve significant benefits. Because voltage adjustments will influence VArs, utilities should also adjust both the placement and control of capacitors.

The asset management 550 may manage power flow requirements to and from assets on the power grid, such as electric vehicles, charging stations, renewable energy sources, substations and transformers.

The LMP (locational marginal pricing) arbitrage 560 may be executed to enable customers to take advantage of a price difference between two or more markets, striking a combination of matching deals that capitalize upon the imbalance, the profit being the difference between the market prices.

The loss minimization 570 may be executed to reduce power losses inherent in lines and loads of the power grid, which is also addressed in the '530 application.

The complex event processor (CEP) 144 may execute complex event processing, which was also addressed as CEP processing in the '053 application. Complex event processing refers to process states, the changes of state exceeding a defined threshold of level such as power, time, or value increment or just of a count as the event. It requires the respective event monitoring, event reporting, event recording and event filtering. An event may be observed as a change of state with any physical or logical or otherwise discriminated condition of and in a technical or economical system, each state information with an attached time stamp defining the order of occurrence and a topology mark defining the location of occurrence.

The CEP 144 may include event correlation engines (event correlators) that analyze a mass of events, pinpoint the most significant ones, and trigger actions. While the CEP 144 may generally relate high-level events with low-level events, the CEP 144 may also generate inferred events using the rules 180 and other artificial intelligence.

The EV optimization engine 142 may work in conjunction with the CEP 144 to analyze data and correlate and/or produce events that may optimize power usage and costs of use of that power within the power grid. The data may include, but not be limited to, power usage history (and other consumer data) received from the electric vehicles 109, EV charging stations 106, event charging or public fleets 107, event/home charging 108, distributed generation 204, renewable energy sources 120 and the other devices 180 that all may be connected to the grid. The consumer data may include a vehicle profile, a price a customer is willing to pay, habits of travel and charging, etc. The data may be provided through a wireless interface so that the system 200 need not necessarily wait for the electric vehicle to be docked to a charging station and may continuously gather and track data. Most new vehicles nowadays include a sensor in the dash that may provide a dedicated data path back to the operating center 110.

The EV optimization engine 142 may send analysis results and suggested control measures to the DMS system 158, which may then send real-time commands to electric vehicles, EV charging stations, substations, pole top or pad transformers and the like to control flow of power, charging timing that affects pricing and availability, and rules related to charging, power flow management and other aspects of optimizing power usage. The CEP 144 may calculate the cost of service, load use and track the cost over time and during different periods. The CEP 144 may further forecast demand of power usage and associated costs appurtenant to that demand in the future.

Analysis results may be presented to the electric vehicles, computers and/or mobile devices of the customers in graphical user interfaces (GUIs) or Web portal of the customers (such as an application or browser or the like as shown in FIG. 4) such that the customers may understand and make usage and charging decisions based thereon. The GUIs may accept selections from the customers to enable scheduling charging times, locations, durations or according to budgets set by the customers based on forecasted costs for a proposed charging schedule.

As one example, a customer may be traveling downtown and anticipates being in town for a period of time. Based on projected location, the system 200 may provide the customer with possible charging locations and rates. If the customer indicates a planned stop to charge at one of those locations, the system 200 (e.g., DMS 158) may alert a substation that handles the power for the charging stations at that location as part of a forecast of demand. That substation may then transfer additional power at the scheduled time to ensure the utility company can meet the increase in demand at that location and time. When the customer arrives, the charging station may send a communication that the identified electric vehicle has plugged in to charge and the system 200 (e.g., the FMIS 119) can charge the customer according to the current rates.

The utility company may provide a rebate to the customer when the customer schedules, ahead of time, a time and place to charge an electric vehicle to incentivize customers alerting the system 200 as to future demand needs, making it easier for the system 200 to forecast expected load distribution.

As another example, a customer may submit preferences with regards to when and where the customer would like to normally charge an electric vehicle and submit other consumer data that can be used to build a profile for the customer. If the customer then decides to charge an electric vehicle outside of the preferred times and locations, the system 200 may charge the customer a premium above and beyond the normal rate.

The distributed intelligence of the present disclosure may occur to different degrees at the different levels discussed with reference to FIG. 3, such as at the enterprise, substation, pole top and street levels. Some of the function of the system 200 at the various levels may be more data gathering and command passing, but at least some of the analysis of the data may be performed at the pole top and/or substation levels—closer to the street level than the enterprise level—which may enable the system 200 to react more quickly to changing power needs based on EV charging and forecasted power needs and costs for the same. Furthermore, decision trees may be built as part of the analysis that may help the CEP 144 build demand forecasts.

For instance, at the pole or pad transformer levels, the rules may relate to managing transformer assets based on assumed and determined load profiles, such as peak power usage during the day, during the hottest or coldest times of day, etc. Rules may support the design of load profiles, which may be tracked by the CEP 144 and stored in the customer profiles database 503. The DMS system 158 may then execute demand response to keep loads on transformers according to the design load profiles. The CEP 144 may track and modify maintenance intervals to maintain power storage at the street level based on frequency of use.

With power usage data that includes historical usage, the charge demand forecaster 590 may use the customer profiles to determine and deliver expected loads in a way that optimizes usage without running out of power. Across thousands of feeders and thousands of transformers, this may be a challenging task and one that is very distributed in nature.

Each substation 105 contains a number of transformers that may be interconnected with a bus (FIG. 3). The system 200 may track loads of pad mount transformers coming in from the field to perform sanity checks regarding historical usage and to also aggregate loads from multiple feeders to then apply rules to those aggregate loads. The system 200 may also look for hot-spots in a substation 105 within this data. In this way, the system 200 may more precisely track the loads and control the loads on the substation transformers.

The rules executed by the EV optimization engine 142 or something equivalent at the substation level such as the charge application 312 may be switching rules in which loads may be shared between substations. The loads could be controlled at the enterprise level or at the substation level. Moreover, an operator may optionally confirm or intervene at the substation level to ensure loads are properly distributed across transformers. The system 200 may be able to extract more complex asset monitoring in the substations. Sensors may be placed on the transformers that communicate over fiber, wireless or via power lines to pass its data to the substation controllers coupled with the charge applications and to the enterprise communication systems (FIG. 3).

The system 200 may also include intelligence at pole top or pad transformers, such as current and voltage control. The system 200 can look at instantaneous values and at spectral content, whether there are power quality issues. The load use tracker 588 and/or the charge application 312 may gather sensed measurements of current and voltage, verify quality and reliability in a transformer, and verify phase connectivity in power lines and transformers. Depending on the parameters loaded into the load use tracker 588 and/or the charge application 312, the system 200 may increase or decrease the power load on respective transformers.

If all electric vehicle owners tried to charge their electric vehicles at the same time, for instance, starting at five or six at night, the power grid would become so loaded that it would not be able to handle the entire load. This is particularly true in urban areas where there may be a larger concentration of electric vehicles. Accordingly, the EV optimization engine 142 may use its rules 580 and other logic to optimize power flows to transformers and charge stations in an equitable way that also facilitates getting the electric vehicles charged in a reasonable amount of time. Some charging stations 106*a* may be standard (Type I) charging stations and provide a trickle charge to charge electric vehicles at a slower rate while other charging stations 106*b* may be high speed chargers (Type II) and thus create a greater drain on the power grid 104. Power can be redistributed to substations and connected transformers to provide additional power during peak periods and at locations containing the high-speed charging stations 106*b*, for instance.

Figure 6:
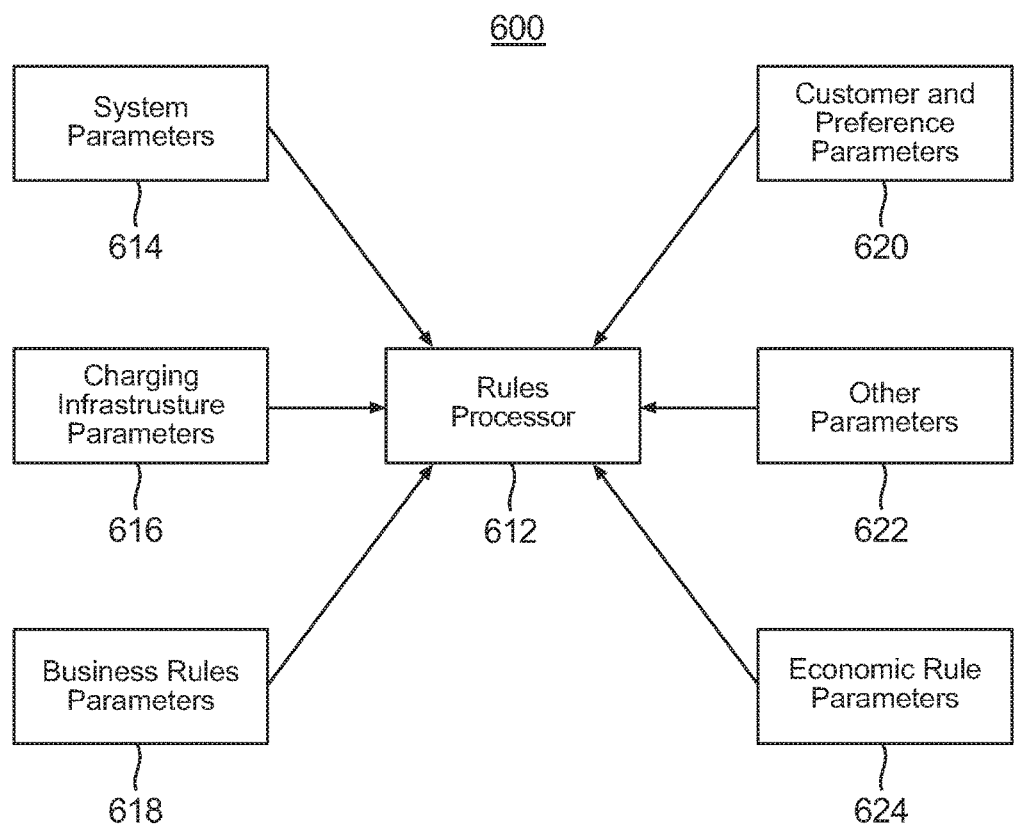
FIG. 6 is a block diagram of an exemplary charging infrastructure control showing inputs into a rules processor.

FIG. 6 is a block diagram of an exemplary charging infrastructure control 600 showing data inputs into a rules processor 612. The rules processor 612 may comprise a processor executing one or more rules discussed herein. The rules processor 612 may be included within the EV optimization engine 142, the complex event processor (CEP) 144 and/or within the charge application 312 depending on what data is analyzed to generate what result. The rules processor 612 may receive the data inputs, analyze the data inputs, and generate, among other outputs any combination of the following: an indicator, a recommendation or other message (for instance to a user's mobile device or electric vehicle), and/or a command to control a part of the grid infrastructure to shift power allocations.

The data inputs into the rules processor 612 may include, but not be limited to, system parameters 614, charging infrastructure parameters 616, business rule parameters 618, customer and preferences parameters 620, other parameters 622 and economic rule parameters 624.

The system parameters 614 may include, but are not limited to, local asset availability such as whether transmission and distribution components near the EV infrastructure is energized and in an available state. The system parameters may also indicate the level of feeder utilization such that a power feeder is capable of supporting vehicle charging, and if so, what level(s) of charging. The system parameters may further indicate whether on-site generation is available (such as whether solar is available or vehicle-to-grid or vehicle-to-vehicle charging supported). The system parameters may further indicate whether on site power storage exists and whether it is sufficient to support or augment charging. The parameters may further indicate whether any operational restrictions are in place, any abnormal events are detected, what mode of operation an EV station is in and whether ancillary services are provisioned.

The infrastructure parameters 616 may include, but are not limited to, indicators regarding whether the EV infrastructure is functioning, whether a charging station outlet is reserved by a user, and what is the level of infrastructure capability (such as Level 1, 2, 3, or vehicle-to-grid (V2G) supported).

The business rule parameters 618 may include, but are not limited to, whether the vehicle accessing the EV infrastructure is a new or an existing customer; whether the vehicle is a loaner or owned by the driver; and how will a payment be made.

The customer and preferences parameters 620 may include, but are not limited to: preferred speed of charge; cost of transaction (buy and/or sell power); purchase preference for source generation (e.g., "green"); purchase benefits for attached generation (e.g., "green"), where attached generation represents any generation source connected to a charging station that could be locally controlled and utilized in order to support the function of the station; reservation and reservation time; customer account information; and incentive, credits and penalties. Some of these preferences were already discussed and inputs to the intelligence determination of the system 200. The customer and preferences parameters may also be extracted from customer profiles.

The other parameters 622 may include, but are not limited to, weather data or significant events that may occur in the power grid 104 that may affect the ability to provide sufficient power for charging that is requested or anticipated based on the above-listed parameters.

The economic rules parameters 624 may include, but are not limited to: rate in effect at time of charging at a charging station; demand response rates in effect such as critical peak pricing or other demand response-related rates; localized rates in effect such as whether the rates are driven by local asset utilization; whether to account for any penalties such as opting out of a demand response event that would decrease or stop power available for charging at a desired time; and applicable rates or tariffs for a transaction during demand response.

Rules may be formulated from any or a combination of the above-listed parameters that form data inputs into the rules processor 612. Some such rules were already discussed with reference to FIGS. 1-5. Another exemplary rule may dictate that if a user waits for an hour to charge his electric vehicle, then the user will save a certain amount of money (like a one dollar discount). Another exemplary rule may dictate that a premium cost is charged for utilizing local generation or attached storage when a demand response event is underway that is attempting to reduce power consumption at the subject charging station.

Figure 7:
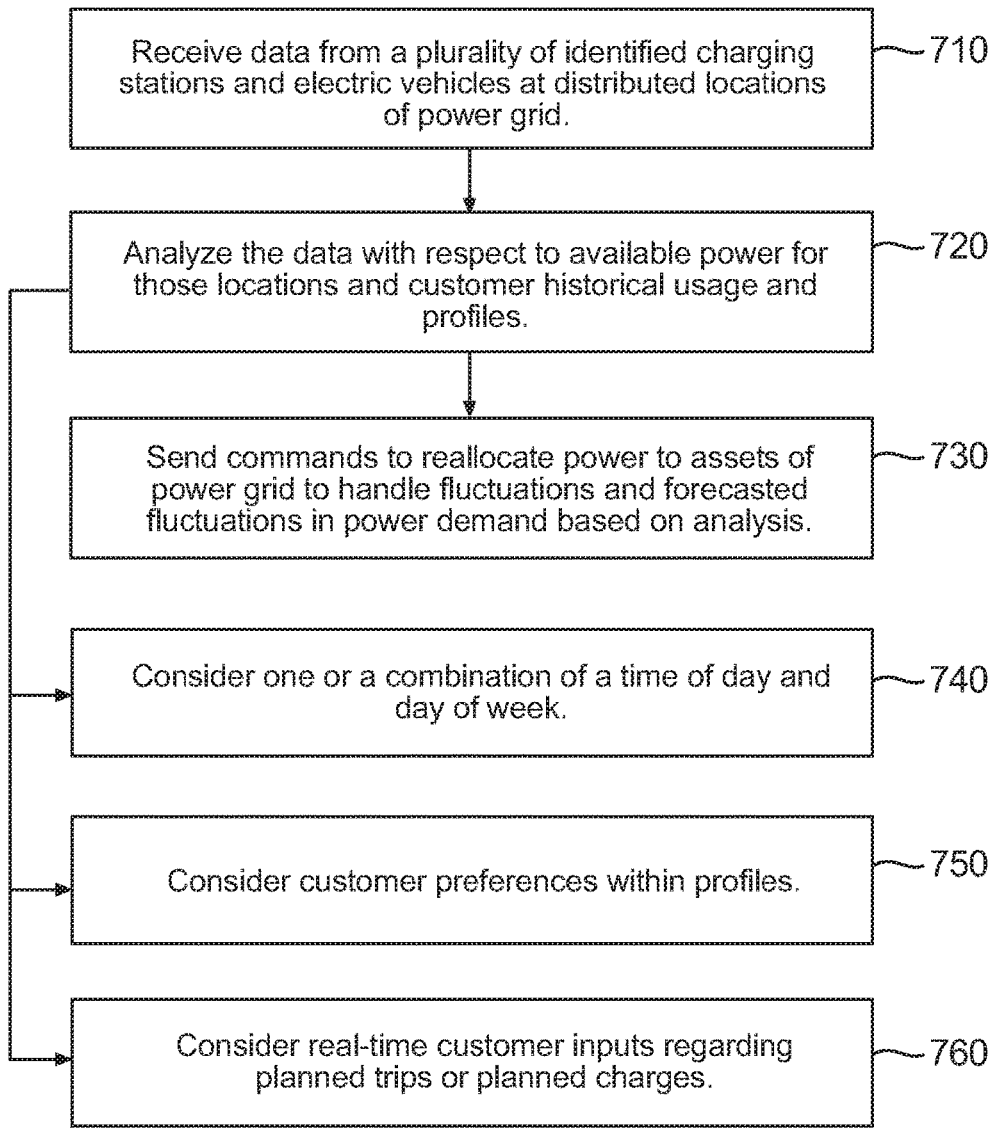
FIG. 7 is a flow chart of an exemplary method for distributed intelligence of power tracking and power allocation in a power grid that supports electric vehicle charging.

FIG. 7 is a flow chart of an exemplary method for distributed intelligence of power tracking and power allocation in a power grid that supports electric vehicle charging. At block 710, at least one computer receives data from a plurality of identified charging stations and electric vehicles of customers at distributed locations throughout a power grid. At block 720, at least one processor of the at least one computer analyzes the data with respect to available power for those locations and customer historical usage and profiles. At block 730, the at least one processor sends commands to reallocate power to assets of the power grid to handle fluctuations or forecasted fluctuations in power demand based on the analysis.

Further to the analysis step of block 720, at block 740, the at least one processor may also consider one or a combination of a time of day and a day of week. Further to the analysis step of block 720, at block 750, the at least one processor may also consider customer preferences that are included in the customer profiles. Further to the analysis step of block 720, at block 740, the at least one processor may also consider real-time customer inputs regarding planned trips or planned charges.

Figure 8:
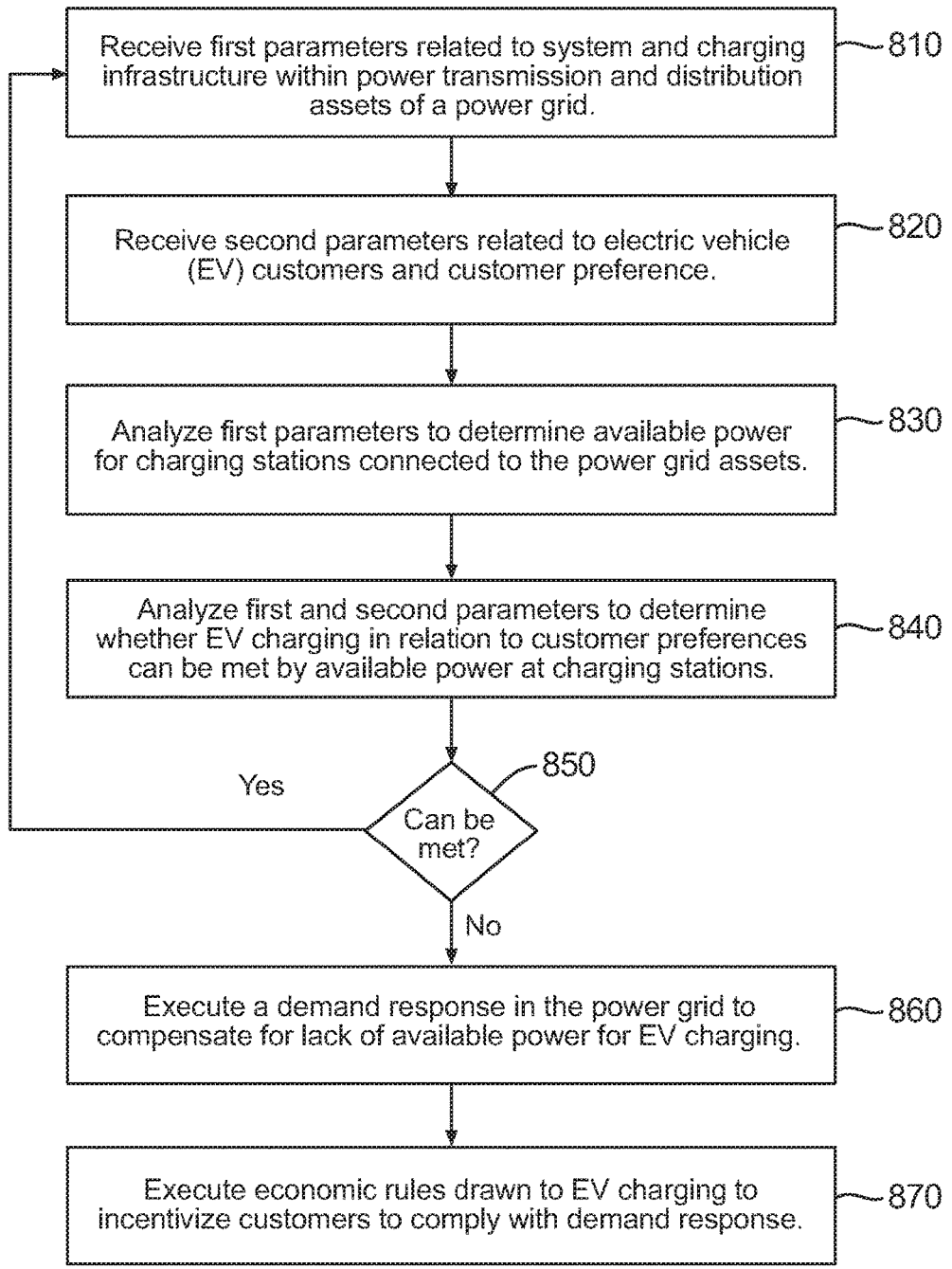
FIG. 8 is a flow chart of another exemplary method for distributed intelligence of power tracking and power allocation in a power grid that supports electric vehicle charging.
Figure 9:
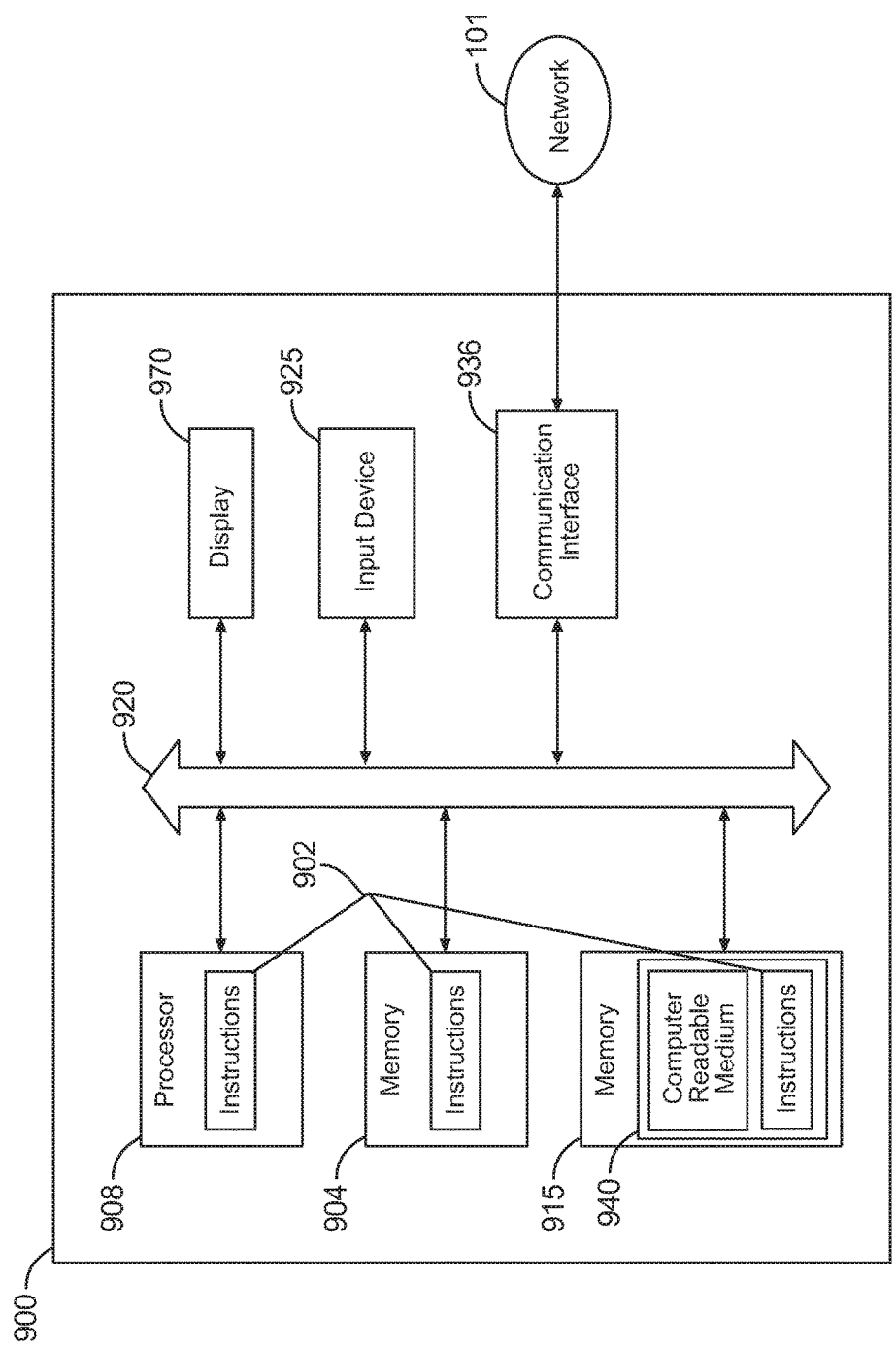
FIG. 9 is a general computer system, programmable to be a specific computer system, which may represent any of the computing devices referenced herein.

FIG. 8 is a flow chart of another exemplary method for distributed intelligence of power tracking and power allocation in a power grid that supports electric vehicle charging. At block 810, at least one computer receives first parameters related to system and charging infrastructure within power transmission and distribution assets of a power grid. At block 820, the at least one computer receives second parameters related to electric vehicle (EV) customers and customer preferences. At block 830, at least one processor of the at least one computer analyzes the first parameters to determine available power for charging stations connected to the power grid assets. At block 840, the at least one processor analyzes the first and second parameters to determine whether EV charging in relation to the customer preferences can be met by the available power at the charging stations.

At block 850, the at least one processor outputs a decision relating to whether the EV charging in relation to the customer preferences can be met by the available power at the charging stations. If the decision is yes, then the method repeats starting back at block 810. IF the decision is no, then at block 860, the at least one processor executes instructions to execute a demand response in the power grid to compensate for a lack of available power for EV charging; and at block 870, executes economic rules drawn to EV charging to incentivize the EV customers to comply with the demand response.

FIG. 8 illustrates a general computer system 900, programmable to be a specific computer system 900, which may represent any server, computer or component (or group thereof) of the charging infrastructure management systems 100, 200. The computer system 900 may include an ordered listing of a set of instructions 902 that may be executed to cause the computer system 900 to perform any one or more of the methods or computer-based functions disclosed herein. The computer system 900 may operate as a stand-alone device or may be connected, e.g., using the network 101, to other computer systems or peripheral devices.

In a networked deployment, the computer system 900 may operate in the capacity of a server or as a client-user computer in a server-client user network environment, or as a peer computer system in a peer-to-peer (or distributed) network environment. The computer system 900 may also be implemented as or incorporated into various devices, such as a personal computer or a mobile computing device capable of executing a set of instructions 902 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 900 may include a memory 904 on a bus 920 for communicating information. Code operable to cause the computer system to perform any of the acts or operations described herein may be stored in the memory 904. The memory 904 may be a random-access memory, read-only memory, programmable memory, hard disk drive or any other type of volatile or non-volatile memory or storage device.

The computer system 900 may include a processor 908, such as a central processing unit (CPU) and/or a graphics processing unit (GPU). The processor 908 may include one or more general processors, digital signal processors, application specific integrated circuits, field programmable gate arrays, digital circuits, optical circuits, analog circuits, combinations thereof, or other now known or later-developed devices for analyzing and processing data. The processor 908 may implement the set of instructions 902 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 900 may also include a disk or optical drive unit 915. The disk drive unit 915 may include a computer-readable medium 940 in which one or more sets of instructions 902, e.g., software, can be embedded. Further, the instructions 902 may perform one or more of the operations as described herein. The instructions 902 may reside completely, or at least partially, within the memory 904 and/or within the processor 908 during execution by the computer system 900. Accordingly, the databases 503 and 505 above in FIG. 5 may be stored in the memory 904 and/or the disk unit 915.

The memory 904 and the processor 908 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 900 may include an input device 925, such as a keyboard or mouse, configured for a user to interact with any of the components of system 900. It may further include a display 970, such as a liquid crystal display (LCD), a cathode ray tube (CRT), or any other display suitable for conveying information. The display 970 may act as an interface for the user to see the functioning of the processor 908, or specifically as an interface with the software stored in the memory 904 or the drive unit 915.

The computer system 900 may include a communication interface 936 that enables communications via the communications network 101. The network 101 may include wired networks, wireless networks, or combinations thereof. The communication interface 936 network may enable communications via any number of communication standards, such as 802.11, 802.17, 802.20, WiMax, 802.15.4, cellular telephone standards, or other communication standards. Just because one of these standards is listed does not mean any one is preferred as any number of these standards may never actually be adopted in a commercial product.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method, comprising:
  receiving, by a computing device, profile parameters communicated from a mobile device, the profile parameters associated with a profile for respective electric vehicles;
  determining, by the computing device, based on the profile parameters, scheduled charging times and scheduled charging locations to charge the electric vehicles, the scheduled charging locations corresponding to charging stations geographically distributed throughout a power grid;
  receiving, by the computing device, parameters at least partially derived from sensor data provided by sensors configured to monitor power grid components, the power grid components configured to affect distribution of power to at least one of the charging stations, the parameters indicative of power made available by the power grid components;
  forecasting, by the computing device, a power demand for charging the electric vehicles at the scheduled charging times and scheduled charging locations;
  determining, by the computing device, that the power demand to charge the electric vehicles is greater or less than power made available by the power grid components at the charging stations; and causing, by the computing device, power to be reallocated among the power grid components in response to determination that the power demand to charge the electric vehicles is greater or less than power made available by the power grid components.

2. The method of claim 1, wherein causing power to be reallocated further comprises:
determining a time at which the power demand will vary from power available by the power grid; and
causing the power to be reallocated before the time.

3. The method of claim 1, wherein the power grid components comprise at least one of a generator, a substation, a feeder circuit, or a transformer.

4. The method of claim 1, further comprising:
receiving a customer preference parameter for charging an electric vehicle at a predetermined time or a predetermined location;
determining that charging the electric vehicle did not occur at a predetermined time;
adjusting the customer preference parameter to generate an adjusted parameter in response to determination that the charging did not occur at the predetermined time; and
causing the electric vehicle to be recharged in accordance with the adjusted parameter.

5. The method of claim 4, wherein adjusting the customer preference parameter comprises at least one of decreasing a charging duration parameter or decreasing a charging speed parameter.

6. The method of claim 1, further comprising
maintaining respective vehicle profiles corresponding to the electric vehicles;
receiving, from the charging stations, power usage information corresponding to the electric vehicles; and
associating the power usage information with the respective vehicles profiles,
wherein the step of forecasting further comprises forecasting a power demand to charge the electric vehicles at the scheduled charging times and scheduled charging locations based on the power usage information corresponding to the electric vehicles.

7. The method of claim 1, further comprising:
receiving a customer preference for charging an electric vehicle, the customer preference comprising a scheduled time for charging the electric vehicle or a scheduled location for charging the electric vehicle; and
communicating, in response to determination the power demand to charge the electric vehicles is greater or less than power available by the power grid components, an alternative scheduled time for charging the electric vehicle or an alternative scheduled location for charging the electric vehicle.

8. A non-transitory storage medium comprising a plurality of instructions executable by a processor, the instructions comprising:
instructions executable by the processor to receive, from a server in communication with a plurality of mobile devices, profile parameters communicated by the mobile devices, the profile parameters associated with respective profiles for electric vehicles;
instructions executable by the processor to determine, based on the profile parameters, scheduled charging times and scheduled charging locations to charge the electric vehicles, the scheduled charging locations corresponding to charging stations geographical distributed throughout a power grid;
instructions executable by the processor to receive parameters at least partially derived from sensor data provided by sensors configured to monitor power grid components, the power grid components configured to distribute power to at least one of the charging stations, the parameters indicative of availability of the power grid components to supply power;
instructions executable by the processor to determine that an expected power demand to charge the electric vehicles at the scheduled charging times and scheduled charging locations varies from the power made available by the power grid components at the charging stations; and
instructions executable by the processor to send a command to reallocate power made available by the power grid components in response to determination that the expected power demand to charge the electric vehicles at the scheduled charging times and scheduled charging locations varies from the power made available by the power grid components, wherein the command reallocates power from a first group of power grid components that provide power to an electric vehicle charging station to a second group of power grid components that provide power to the electric vehicle charging station.

9. The non-transitory storage medium of claim 8, further comprising:
instructions executable by the processor to determine a peak time that the expected power demand to charge the electric vehicles at the scheduled charging times and scheduled charging locations exceeds power made available by the power grid; and
instructions executable by the processor to send the command before the peak time.

10. The non-transitory storage medium of claim 8, wherein the instructions executable by the processor to determine scheduled charging times and scheduled charging locations further comprises:
instructions executable by the processor to communicate, to a remote device, a suggested time and a suggested location corresponding to a charging station; and
instructions executable by the processor to receive, from the remote device, selection information indicative of a selected time and a selected location.

11. The non-transitory storage medium of claim 8, further comprising:
instructions executable by the processor to send the command to a substation configured to affect a supply of power to the charging station.

12. The non-transitory storage medium of claim 8, further comprising
instructions executable by the processor to receive a customer preference, the customer preference comprising a first parameter for charging an electric vehicle;
instructions executable to identify a second parameter for charging the electric vehicle; and
causing the electric vehicle to be recharged in accordance with the second parameter instead of the first parameter in response to determination that the expected power demand to charge the electric vehicles at the scheduled charging times and scheduled charging locations varies from power available by the power grid components.

13. The non-transitory storage medium of claim 12, wherein the first parameter comprises a first rate of charging the electric vehicle and the second parameter comprises a second rate of charging the electric vehicle.

14. The non-transitory storage medium of claim 8, further comprising
   instructions executable by the processor to maintain respective vehicle profiles corresponding to the electric vehicles;
   instructions executable by the processor to receive, from the charging stations, power usage information corresponding to the electric vehicles;
   instructions executable by the processor to associate the power usage information with the respective vehicles profiles; and
   instructions executable by the processor to forecast the expected power demand to charge the electric vehicles based on the power usage information associated with the respective vehicle profiles.

15. A system, comprising
   a processor, the processor configured to:
   receive a customer parameter communicated over a network from a remote device, the customer parameter related to charging an electric vehicle;
   determine, based on the customer parameter, a scheduled charging time and a scheduled charging location to charge the electric vehicle, the scheduled charging location corresponding to a charging station geographical distributed in a power grid;
   receive parameters at least partially derived from sensor data communicated by sensors configured to monitor power grid components that affect distribution of power to the charging station, the sensor data indicative of power availability via the power grid components;
   determine that a power demand to charge electric vehicles at scheduled charging times and scheduled charging locations varies from power availability via the power grid components; and
   communicate a command to reallocate power among the power grid components in response to determination that the power demand to charge the electric vehicles at the scheduled charging times and scheduled charging locations varies from power availability via the power grid components, wherein the command reallocates power from a first substation that does not provide power to the electric vehicle charging station to a second substation that provides power to the electric vehicle charging station.

16. The system of claim 15, wherein the processor is further configured to:
   determine a peak time that a power demand to support charging the electric vehicles at the scheduled charging times and scheduled charging locations exceeds power availability via the power grid; and
   communicate the command before the peak time.

17. The system of claim 15, wherein the processor is further configured to:
   forecast that the power demand to charge the electric vehicles exceeds the power availability via the power grid components at the scheduled location;
   identify a parameter of a customer profile that affects charging the electric vehicle; and
   modify the parameter of the customer profile to generate a modified parameter configured to decrease the power demand to charge the electric vehicle via the power grid components at the scheduled location.

18. The system of claim 15, wherein the customer parameter comprises a first parameter related to charging the electric vehicle, the processor is further configured to:
   determine a second parameter for charging the electric vehicle, the second parameter determined in response to the determination that power demand to charge the electric vehicles at the scheduled charging times and scheduled charging locations varies from power availability via the power grid components; and
   communicate a command that causes the electric vehicle to be recharged in accordance with the second parameter instead of the first parameter.

19. The system of claim 15, wherein the processor is further configured to:
   receive, from the charging stations, power usage information corresponding to the electric vehicles;
   associate the power usage information with respective vehicles profiles corresponding to the electric vehicles; and
   forecast the power demand to charge the electric vehicles based on the power usage information associated with the respective vehicle profiles.

20. The system of claim 15, the processor is further configured to:
   determine a shortage of available power for electric vehicle charging in response to determination that the power demand to charge the electric vehicles at the scheduled charging times and scheduled charging locations varies from power availability via the power grid components; and
   perform a demand response in the power grid that compensates for the shortage of available power.

* * * * *